United States Patent [19]

Morokuma et al.

[11] 4,131,361

[45] Dec. 26, 1978

[54] ILLUMINATION DEVICE

[75] Inventors: Tadashi Morokuma; Kenichi Oinoue, both of Tokyo, Japan

[73] Assignee: Olympus Optical Co., Ltd., Tokyo, Japan

[21] Appl. No.: 814,119

[22] Filed: Jul. 8, 1977

[30] Foreign Application Priority Data

Jul. 16, 1976 [JP] Japan ................................. 51-84553
Jul. 16, 1976 [JP] Japan ................................. 51-84554

[51] Int. Cl.² ............................................. G03B 27/54
[52] U.S. Cl. ......................................... 355/70; 362/11
[58] Field of Search .................... 355/37, 70, 113, 71, 355/78–80; 362/11, 224, 225

[56] References Cited

U.S. PATENT DOCUMENTS 3,375,361  3/1968  Thompson et al. ............... 362/11 X
3,941,475  3/1976  Sheets .................................. 355/78

Primary Examiner—Richard A. Wintercorn
Attorney, Agent, or Firm—Haseltine, Lake & Waters

[57] ABSTRACT

An illumination device used in the case of forming, on a dupe film, a visible copy of an image pattern of a master film. The illumination device comprises a light source including a center portion having a high brightness and a peripheral portion for emitting light in all directions, and a collimator lens having an optical axis that passes through the high brightness center portion of the light source.

3 Claims, 4 Drawing Figures

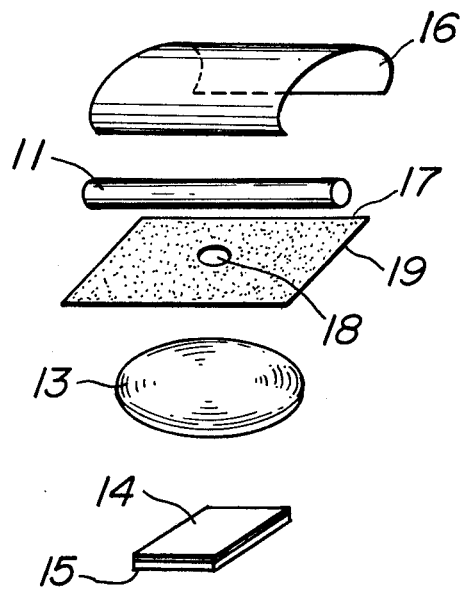
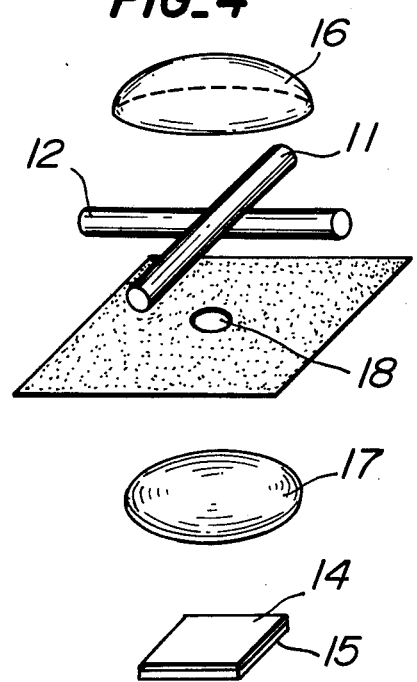

ILLUMINATION DEVICE

This invention relates to an illumination device used in the case of forming, on a dupe film, a visible copy of an image pattern of a master film.

Such conventional illumination device comprises a light source composed of an elongate lamp such as xenon lamp etc. Such light source is large in length so that it is impossible to form, on the dupe film, the visible copy of an image chart of the master film composed of a group of lines arranged in a direction perpendicular to the lengthwise direction of the light source with a sufficiently large resolving power.

In order to prevent the resolving power of the dupe film from being degraded, the master film is required to be illuminated with light flux emitted from the light source in parallel with the lengthwise direction of the light source. For this purpose, provision must be made of a point light source having a high brightness. Particularly, if use is made of a dupe film having a low sensitivity, it is necessary to make the brightness of the light source significantly high. But, it is impossible to provide a point light source having a high brightness, so that there is a risk of the brightness of the conventional illumination device being insufficient and hence the illumination device could not be used in the case of forming, on the dupe film, the visible copy of the image pattern of the master film.

An object of the invention, therefore, is to provide an illumination device used in the case of forming, on a dupe film, a visible copy of an image pattern of a master film, which can form on the dupe film the picture image of the master film without degrading the resolving power of the overall picture image of the dupe film and with a sufficiently high brightness.

A feature of the invention is the provision of an illumination device used in the case of forming, on a dupe film, a visible copy of an image pattern of a master film, comprising a light source including a center portion having a high brightness and a peripheral portion for emitting light in all directions, and a collimator lens having an optical axis that passes through the center high brightness portion of the light source, said master film being located at directly below the collimator lens and placed on the dupe film.

The invention will now be described in greater detail with reference to the accompanying drawings, wherein:

FIG. 3 is a perspective view of another embodiment of an illumination device according to the invention; and FIG. 4 is a perspective view of a further embodiment of an illumination device according to the invention.

Figure 1:
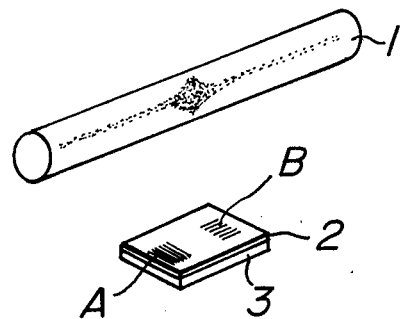
FIG. 1 is a perspective view of a conventional illumination device used in the case of forming, on a dupe film, a visible copy of an image pattern of a master film.

In FIG. 1 is shown an illumination device used in the case of forming, on a dupe film, a visible copy of an image pattern of a master film. In FIG. 1, reference numeral 1 designates an elongate light source such as a xenon lamp etc., 2 a master film formed thereon with a desired image pattern, and 3 a dupe film, i.e., a duplicating film on which is closely placed the master film 2 and onto which is to be formed with the image pattern of the master film 2.

In such conventional illumination device, since the light source 1 is long in length, it is impossible to form, on the dupe film 3, a visible copy of an image chart composed of a group of lines A arranged side by side on the master film 2 in a direction perpendicular to the lengthwise direction of the light source 1 with a sufficiently high resolving power. In this case, another image chart composed of a group of lines B arranged side by side on the master film 2 in a direction parallel to the lengthwise direction of the light source 1 can be formed on the dupe film 3 with the sufficiently high resolving power. This is because of the fact that the master film 2 provided thereon with an emulsion layer of several $\mu$, i.e., 4 to 10$\mu$ in thickness, so that the light flux emitted from the light source 1 obliquely passes through the emulsion layer.

In order to eliminate the problem of degrading the resolving power of the dupe film 3, the master film 2 must be illuminated with a light flux which is parallel with the lengthwise direction of the light source 1. For this purpose, the light source 1 is required to be of a point light source having a high brightness and the light flux emitted therefrom is made substantially parallel with the aid of a collimator lens. Particularly, in the case of using a dupe film having a low sensitivity, use must be made of a point light source having a very high brightness. But, it is impossible to provide such point light source, so that the brightness of the light source of the illumination device becomes insufficient. In order to eliminate such difficult problem which has been encountered with the prior art techniques, the invention provides the following novel technique.

Figure 2:
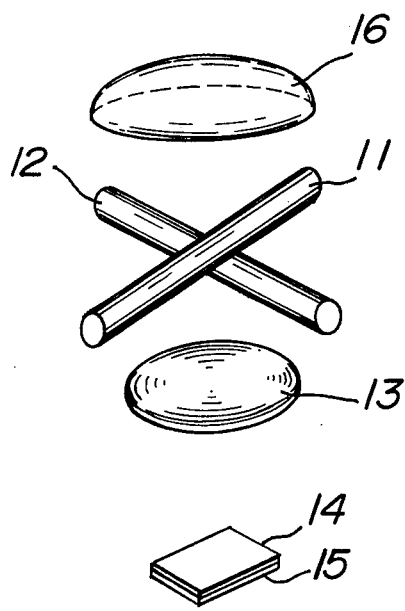
FIG. 2 is a perspective view of one embodiment of an illumination device according to the invention.

In FIG. 2 is shown one embodiment of the present invention. In the present embodiment, use is made of a light source composed of two elongate light sources 11, 12 each having a high brightness such as a xenon lamp. These lamps 11, 12 are superimposed one upon the other and perpendicularly crossed with each other. Directly below the light source 11, 12 is arranged a collimator lens 13 for making the light flux incident thereon from the light source 11, 12 parallel with each other. Below the collimator lens 13 is arranged a master film 14 closely placed on a dupe film 15. Each of the light source 11, 12 has its crossing point aligned with the optical axis of the collimator lens 13. Each of the closely superimposed films 1, 2 is made perpendicular to the optical axis of the collimator lens 13.

The illumination device constructed as above described is capable of making the brightness of the light flux emitted from the two light sources 11, 12 higher than that of one light source and of arranging a light source having a high brightness and constituting substantially a point light source on the optical axis of the collimator lens 13. As a result, the collimator lens 13 causes the light flux emitted from the light sources 11, 12 to be made substantially parallel and these parallel light flux is incident on the master film 14. The light flux emitted from the peripehral portion around the center crossing point of the two light sources 11, 12 passes through the collimator lens 13 and is incident on the master film 14. In the present embodiment, the image chart composed of a group of lines arranged side by side on the master film 14 becomes not perpendicular to the lengthwise directions of both the light sources 11, 12. As a result, it is possible to prevent the resolving power of the dupe film 15 from becomming degraded and obtain light energy which is necessary for exposing the dupe film 15.

Provision may be made of a diaphragm arranged near the crossing point of the two light sources 11, 12 when the light flux emitted from the two light sources 11, 12 is sufficiently high. Reference numeral 16 designates a concave reflecting mirror. In the present embodiment, the concave reflecting mirror 16 is formed of a concave semicylindrical body. As stated hereinbefore, the present embodiment makes use of two elongate light sources perpendicularly crossed with each other so as to provide a substantially point light source having a high brightness and also makes use of a combination of such point light source and a collimator lens so as to cause a light flux to incident on a master film substantially perpendicular thereto. It is also possible to illuminate the master film with a light flux emitted in all directions from the peripheral portion of the two light sources. As a result, it is possible not only to reproduce a picture image of a master film on a dupe film without degrading its resolving power and but also to obtain a light energy which is sufficient to expose the dupe film.

In FIG. 3 is shown another embodiment of an illumination device according to the invention. In the present embodiment, the reflecting mirror 16 is formed of a concave semicylindrical mirror. The light source is composed of an elongate light source 11 having a high brightness such as a xenon lamp etc. and a filter member 17 arranged directly below the light source 11 and having a center light transmission portion 18. The light transmission portion 18 functions to transmit the light flux emitted from the light source 11 therethrough in a convergent or divergent manner. That portion 19 of the filter member 17 which is exclusive of the light transmission portion 18 is formed of a frosted glass and functions to scatter the light flux. All of the light source 11, the light transmission portion 18 and the collimator lens 13 are aligned on a common optical axis.

In the present embodiment, a center portion of the light flux emitted from the light source 11 passes through the light transmission portion 18 and is changed into a parallel light flux which is then incident on the master film 14. That portion of the light flux emitted from the light source 11 which does not pass through the light transmission portion 18 is incident on the light scattering portion 19 of the filter member 17 which causes the incident light to emit in all directions. This scattered light flux is incident on the collimator lens 13 and then illuminates the master film 14.

The light transmission portion 18 of the filter member 17 is required to have a dimension which is sufficient to obtain a light energy necessary for exposing the dupe film 15.

The light flux incident on the master film 14, however, it spread to an extent determined by the dimension of the light transmission portion 18, so that a large light transmission portion 18 results in an increase of an obliquely incident light due to the presence of a transmission light having a directivity, thereby degrading the resolving power of the dupe film 15. Thus, the dimension of the light transmission portion 18 is suitably determined by taking the required light energy and degradation of the resolving power of the dupe film 15 into consideration.

The light transmission portion 18 may be formed of an opening fitted with a convergent lens or divergent lens. For example, if the light transmission portion 18 is formed of the convergent lens, the focal point of the collimator lens 13 is arranged near a point at which an image is formed by the convergent lens.

The light scattering portion 19 is not always formed of the frosted glass, but may be formed of any material having an ability of scattering the light flux. The light transmission portion 18 may be formed of an opening per se.

In addition, the light source is not limited to an elongate light source, but use may be made of a plane light source.

As stated hereinbefore, the present embodiment makes use of a light source including a light transmission portion of a filter member so as to provide a substantially point light source having a high brightness and makes use of a combination of such point light source and a collimator lens so as to cause a light flux to incident on a master film substantially perpendicular thereto and illuminate the master film with a light flux emitted in all directions from the peripheral portion of the light emitted portion. As a result, it is possible not only to reproduce a picture image of the master film on a dupe film without degrading its resolving power and but also to obtain a light energy which is sufficient to expose the dupe film.

In FIG. 4 is shown a further embodiment of an illumination device according to the invention. In the present embodiment, use is made of the concave reflecting mirror 16 shown in FIG. 2 and of the light source formed of the two elongate light sources 11, 12 crossed at right angles as shown in FIG. 2 and associated with the filter member 17 having the center light transmission portion 18 shown in FIG. 3.

The operation of the illumination device shown in FIG. 4 is just the same as those of the illumination devices shown in FIGS. 2 and 3.

What is claimed is:

1. An illumination device used in the case of forming, on a dupe film, a visible copy of an image pattern of a master film, comprising an elongated bar-shaped light source including a center portion having a brightness and a peripheral portion for emitting light in all directions, and a collimator lens having an optical axis that passes through the center high brightness portion of said light source, said master film being located at directly below said collimator lens and placed on said dupe film.

2. The illumination device according to claim 1 wherein said light source is composed of at least two elongated bar-shaped light sources superimposed one upon the other and crossed at an angle and said collimator lens having an optical axis that passes through said crossing point.

3. The illumination device according to claim 1 wherein said light source is composed of an elongated bar-shaped light source and a filter member arranged directly below said elongated light source and having a center light transmission portion and a peripheral portion exclusive of said light transmission portion and scattering a light flux emitted from said light source and said collimator lens is arranged between said filter member and said master film.

* * * * *